United States Patent [19]
Buurman

[11] 3,870,498
[45] Mar. 11, 1975

[54] METHOD OF MANUFACTURING HOLLOW GLASS ARTICLES

[75] Inventor: Herman Buurman, Emmasingel, Eindhoven, Netherlands

[73] Assignee: U.S. Philips Corporation, New York, N.Y.

[22] Filed: Sept. 28, 1973

[21] Appl. No.: 401,641

[30] Foreign Application Priority Data
Apr. 16, 1973 Netherlands...................... 7305264

[52] U.S. Cl....................... 65/106, 65/112, 65/127, 65/184, 65/241, 65/260
[51] Int. Cl............................................. C03b 21/00
[58] Field of Search ............ 65/112, 113, 260, 239, 65/177, 241, 232, 106, 127, 184

[56] References Cited
UNITED STATES PATENTS

| | | |
|---|---|---|
| 1,626,702 | 5/1927 | Soubier............................ 65/241 X |
| 2,534,547 | 12/1950 | Eisler................................ 65/174 X |
| 3,510,287 | 5/1970 | Panczner ............................. 65/113 |
| 3,705,026 | 12/1972 | McReynolds et al. ............ 65/260 X |
| 3,734,704 | 5/1973 | Fike................................... 65/113 X |

Primary Examiner—S. Leon Bashore
Assistant Examiner—Frank W. Miga
Attorney, Agent, or Firm—Frank R. Trifari

[57] ABSTRACT

A method of manufacturing hollow glass articles in which glass charges which are severed from a glass stream are shaped into blanks which are deposited on carriers and which are formed in a subsequent forming operation into hollow articles having an open end; because according to the invention the formed articles are removed from the carriers in a position in which their open end is directed downwards, glass chips cannot drop and adhere in or on the articles.

2 Claims, 15 Drawing Figures

METHOD OF MANUFACTURING HOLLOW GLASS ARTICLES

The invention relates to a method of manufacturing hollow glass articles, in which a stream of molten glass is given a flat shape and is deposited on carriers travelling along a closed path and provided with openings such that the glass covers the openings in the carriers, the glass portions which cover the openings subsequently sagging through the openings and being formed into hollow articles by a forming operation, the said articles having an open end at the level of the openings, the articles thus obtained being finally separated and removed from the carriers.

With such a method, disclosed in German Patent Application No. 2,115,541, for example, incandescent lamp bulbs, bottles, tableware etc. can be manufactured. In this known method the articles and the remaining glass portions remaining on the carriers are separated from each other and removed from the carriers by means of knife blades. The articles are then in a position in which their open end is directed upwards. Glass chips which are formed upon separation of the articles will drop partly onto and partly into the articles via the open end, and will adhere because the articles are still hot. Hollow glass articles having adhered chips on their inner wall are undesirable, and even unacceptable for some products. Chips on the frosted inner wall of incandescent lamp bulbs cause non-frosted light windows; chips, notably on the inner wall of bottles and particularly of thin-walled bottles, caused undesired defects which have an adverse effect on the strength of the glass.

The invention has for its object to provide a method enabling the manufacture of hollow glass articles which are free from chips adhering to the inner wall and which have a virgin-like, undamaged surface.

According to the invention, this object is mainly achieved by removing the articles are removed from the carriers in a position in which their open end is directed downwards. As a result of this step it is very simple to prevent chips from setting in the articles upon separation and removal of the articles and of the remaining glass portion.

In the known method, the carriers complete part of their path with their carrying surface directed downwards; in performing the method according to the invention, the articles could be removed from the carriers on this portion of the path.

The invention can be used particularly advantageously in a method which is known from U.S. Pat. No. 2,263,126, in which a glass stream is cut into glass charges which are shaped into blanks, the blanks being successively transferred onto carriers travelling in a horizontal plane such that the blanks cover an opening in the carriers with their central portion and bear on the carriers with their edge portion, the central portion of each blank being subsequently formed into a hollow article by sagging through the associated opening and by subjection to a forming operation. The said hollow articles then have an open end at the level of the opening with the edge portion forming a flange surrounding the open end, the articles thus obtained and the flanges ultimately being separated from each other and removed from the carriers. According to a preferred embodiment of the method according to the invention before the articles and the flanges are separated, the carriers are rotated about a horizontal axis such that the open ends of the articles are directed downwards. Consequently, by this special method where the carriers circulate in a horizontal plane, chips are prevented from settling in or on the articles.

It is to be noted that French Patent Specification No. 1,115,074 proposed to prevent the settling of chips in the articles by removing these articles as quickly as possible from the carriers; the effect of this step, however, is very dubious because the articles then also occupy a position in which their open end is directed upwards.

In the method according to the invention the object is substantially achieved if the articles are directed downwards, their longitudinal axis then enclosing an angle with the vertical; however, scattered chips might then still settle on the surface adjoining the open end. The adhering of scattered chips is also prevented in another preferred embodiment of the method according to the invention in that the carriers are rotated through an angle of 180°.

Hollow glass articles manufactured by the method according to the invention are characterized by a virgin-like and chip-free inner surface and outer surface, and have a regular appearance.

The invention furthermore relates to a device for performing the method according to the invention. This device is provided, in the manner already described in U.S. Pat. No. 2,263,126, with a glass shear, a blank-shaping mechanism, and a blowing unit comprising a series of carriers displaceable in a closed path, each provided with an opening, and journalled to be rotatable and slidable in a direction transverse to their travelling direction, said blowing unit furthermore comprising blowing heads and blowing molds cooperating with the carriers. According to the invention, a device is provided in which the carriers are rotatable about a horizontal geometrical axis.

As a result of the rotation of the carriers about a horizontal axis, the objects formed can be readily brought into the desired position, i.e., with their open end directed downwards.

Because in a preferred embodiment of the device according to the invention the horizontal geometrical axis extends transverse with respect to the travelling direction of the carriers a compact construction can be obtained. The combined sliding movement in a radial direction and rotating movement about a transverse axis results in a minimum pitch of the carriers.

In another preferred embodiment of the device according to the invention, each carrier is mounted on a shaft which is journalled in a housing and which is rotatable and slidable with respect to the housing by means of guides and cams. As a result, the carriers can be simply controlled.

The shafts of the carriers can be accommodated in a common housing. However, a further preferred embodiment of the device according to the invention is characterized in that each carrier is journalled with its shaft and the associated guides in a separate housing and constitutes a unit therewith, a series of identical units being arranged on the circumference of a rotating table. As a result, any defective unit can be quickly replaced by another unit so that the idle time caused thereby is minimized.

If during the blowing operation the blowing heads take an eccentric position with respect to the openings in the carriers, the articles formed will have a non-identical wall thickness distribution, which causes comparatively many rejects and breakdowns in the further treatment and processing of the articles. In a final preferred embodiment of the device according to the invention this risk is precluded by mounting on each unit a blowing head which cooperates with the carrier journalled therein. By combining the blowing heads with the units which are present anyway, an extremely accurate positioning and centering of the blowing heads with respect to the openings in the carriers is achieved in a very simple and advantageous manner. The centering of the blowing molds with respect to the carriers is less critical, so that the blowing molds need not be mounted on the units.

The invention will be described in detail hereinafter with reference to the drawing.

Figure 1A:
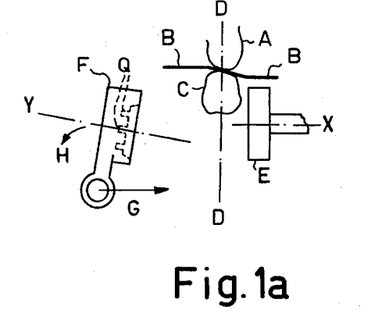
FIGS. 1a and 1i diagrammatically show a number of successive phases in the manufacture of a hollow glass article by the method according to the invention.
Figure 1B:
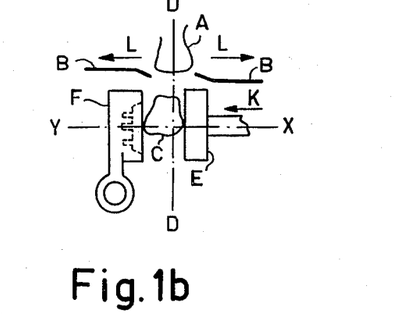
Figure 1C:
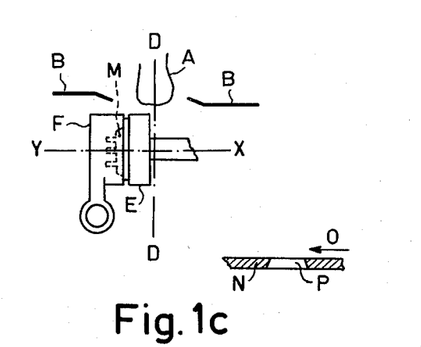

The method according to the invention will be described in detail with reference to the FIGS. 1a to 1i. FIG. 1a illustrates the cutting phase in which a glass charge C is severed from a glass stream A by means of shear blades B; the letter D denotes the center lines of the glass stream A; a shaping cup E which acts as a die is stationary at this instant, while a mold like shaping cup F performs a combined linear and rotary movement according to the arrows G and H in the direction of the die E. FIG. 1b shows the seizure phase in which the severed glass charge C is seized during its free fall and is pressed into the mould F which has come to rest by the die E which linearly moves in the horizontal direction according to the arrow K, while the shear blades B move to the rest position in the direction denoted by the arrows L. FIG. 1c shows the pressing of the seized glass charge into a blank M by the cups E and F; N denotes a plate-like carrier which travels in the direction O and which is provided with an opening P.

Figure 1D:
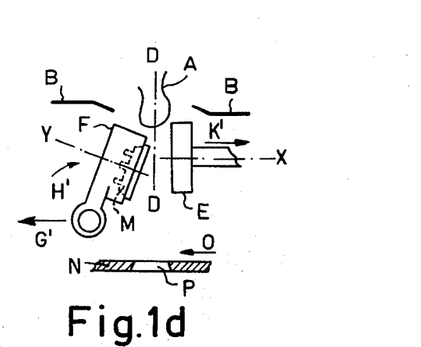
Figures 1E, 1F:
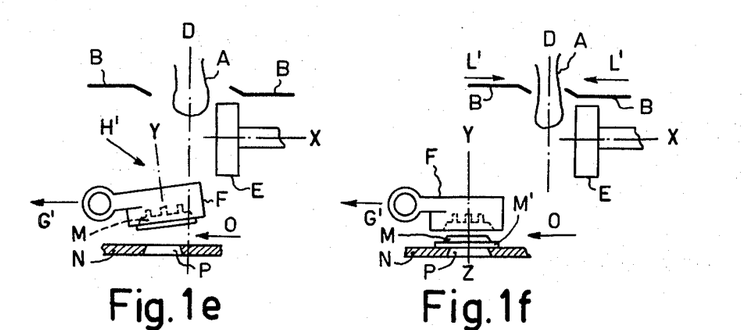

FIG. 1d shows the beginning of the transfer phase; the die E is returning in the horizontal direction according to arrow K' to the rest position shown in FIG. 1a; the mold F performs a combined linear and rotary movement according to the arrows G' and H' in the direction of the carrier N which meanwhile has closely approached the center line D of the glass stream A; during the transport of the blank M it is held in the mold F by vacuum in ducts Q (FIG. 1a). In the phase shown in FIG. 1e, the die E is again in the rest position, while the mold F still performs a combined rotary and linear movement; the carrier N has meanwhile passed the center line D of the glass stream A. FIG. 1f shows the instant at which the blank M is deposited on the opening P of the carrier N, the vacuum in the ducts Q of the mold F being replaced by an overpressure; in this phase the mold F is displaced in the horizontal direction only according to the arrow G' at a speed and in a direction which are the same as the speed and the direction of the carrier N; the blank M covers the opening P with its edge-portion M' bearing on the carrier, the shear blades B start their cutting movement again according to the arrows L'.

Figure 1G:
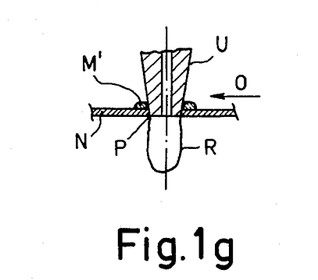
Figure 1H:
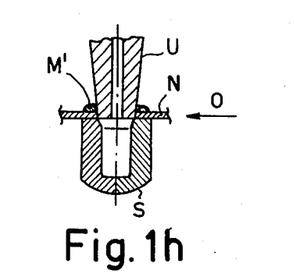
Figure 1I:
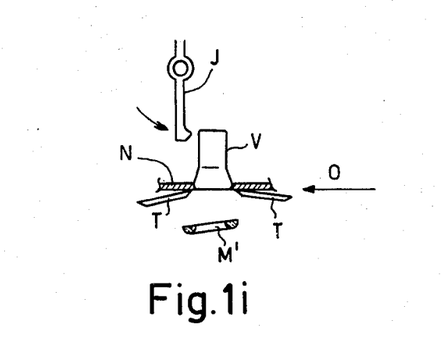

After the central portion of the blank M has sagged somewhat through the opening P of the carrier N, this portion is completely pressed through the opening P in known manner by means of a blowing head U and is blown so as to form a parison R (FIG. 1g). According to FIG. 1h, the parison is given its ultimate shape by means of a blowing mold S. Using rotating blades T and a hammer J, the flange portion M' of the original blank and the blown article V are separated from each other and are removed from the carrier N; as is shown in FIG. 1i, the article V has been brought into a position in which its open end is directed downwards so that chips which are formed upon the separation and removal of the flange portion and article cannot drop onto or into the article. The article can be readily put into this position by rotation of the carriers about a horizontal axis.

Figure 2:
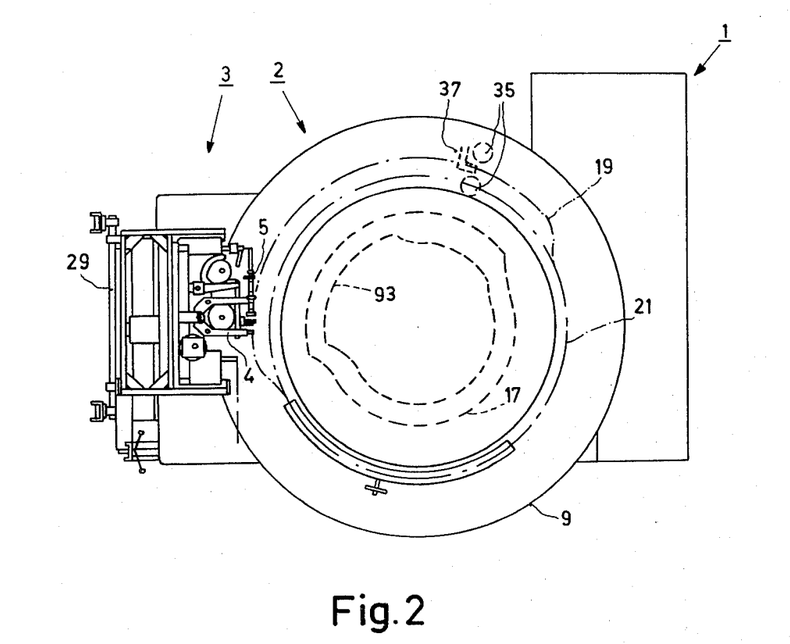
FIG. 2 is a plan view of an embodiment of the device according to the invention.
Figure 3:
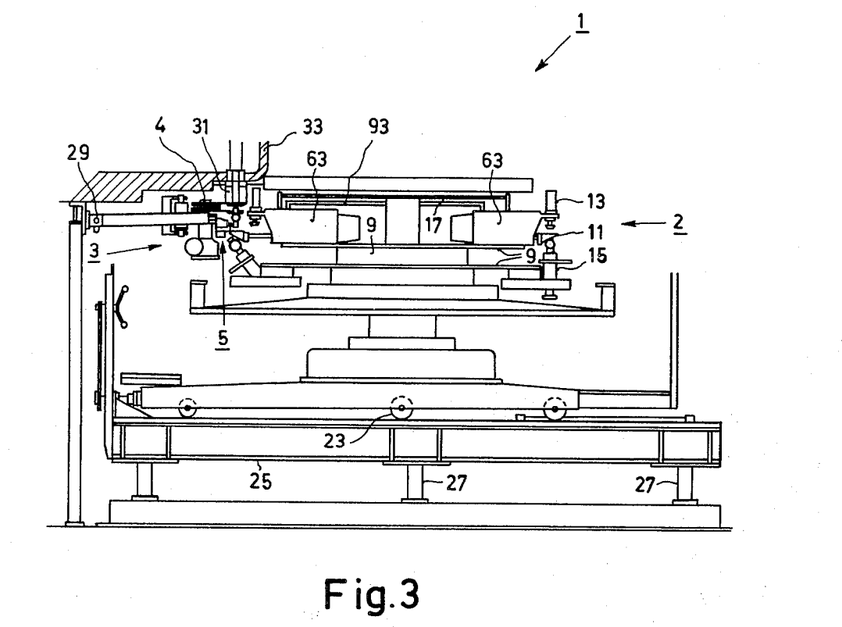
FIG. 3 is a side elevation of the device.

FIGS. 2 and 3 are a plan view and a side elevation, respectively, of a device for performing the method according to the invention, only the elements which are necessary for the understanding of the invention being shown. This device 1 mainly consists of a blowing unit 2 and a cutting-shaping unit 3, comprising a glass shear 4 and a blank-shaping mechanism 5; both units are arranged to be separate from each other. The blowing unit 2 comprises a rotary table 9 which is driven at constant speed by a motor not shown and which comprises a series of plate-like carriers 11 each provided with an opening 12 (FIG. 5) and cooperating with blowing heads 13 and pivotable blowing molds 15. The carriers 11 are slidable between a slid-out position shown on the left in FIG. 3 and a withdrawn blowing position shown on the right in FIG. 3 by way of a stationary cam disc 17 such that the center line 18 (FIG. 5) of their opening 12 follows the path denoted by 19 in FIG. 2.

The blowing unit 2 is provided with wheels 23 resting on a frame 25 and can be displaced in the horizontal direction. The frame 25 with the blowing unit 2 can furthermore be adjusted in the vertical direction by means of jacks 27. The cutting-shaping unit 3 is arranged to be pivotable about a fixed shaft 29. The reference 31 denotes the outlet of a feeder 33 of a glass furnace not shown. Arranged on the circumference of the rotating table 9 are two rotatable blades 35 and a hammer 37.

Figure 4:
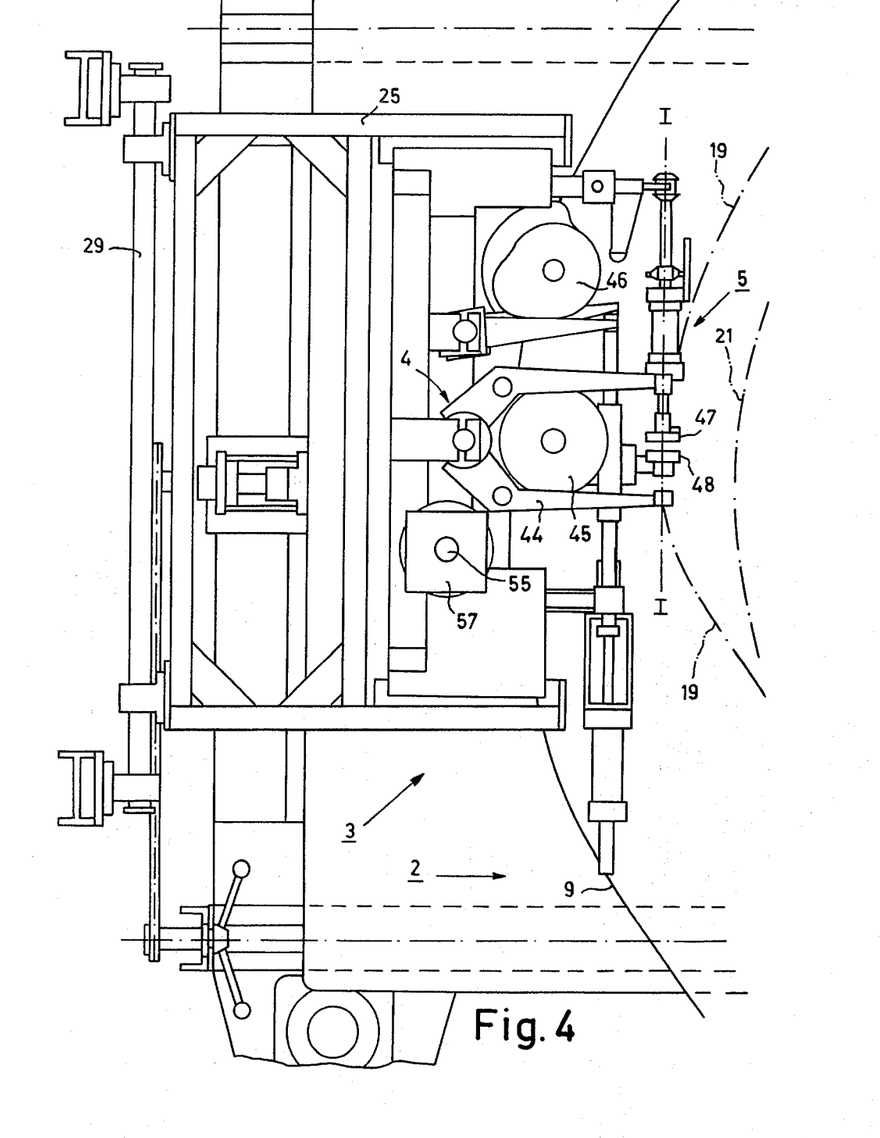
FIG. 4 is a plan view at an increased scale of a part of the device.
Figure 5:
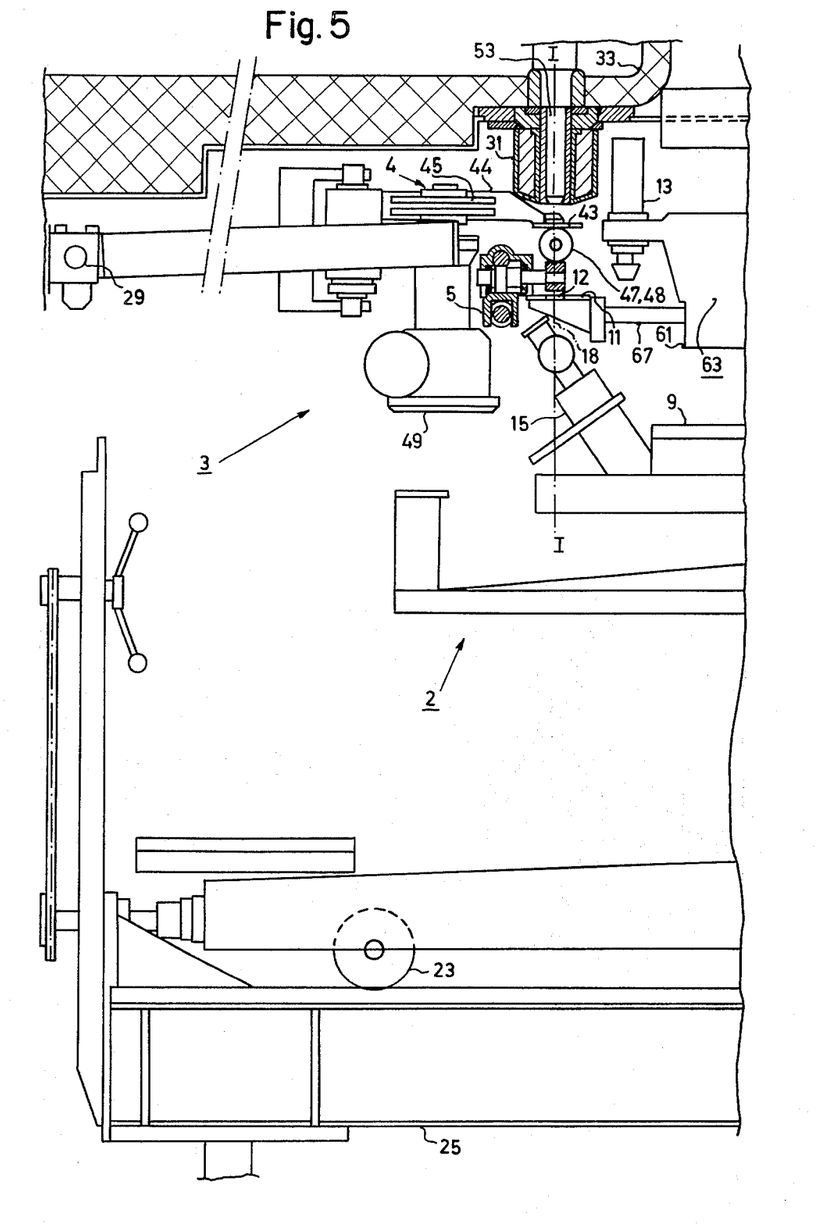
FIG. 5 is a side elevation of the part of the device shown in FIG. 4, and FIGS. 6 and 7 show a unit with a carrier in various positions.

FIGS. 4 and 5 are a plan view and a side elevation, respectively, at an increased scale of the cutting-shaping unit 3 with part of the blowing unit 2, given parts being omitted in FIG. 4 for the sake of clarity. The cutting-shaping unit 3, comprising the glass shear 4 with shear blades 43, the blank-shaping mechanism 5 with shaping cups 47 and 48, and a drive mechanism 49, is driven at constant speed and synchronous with the blowing unit 2 by a motor not shown. The shear blades 43 are mounted on shear arms 44 which are driven by a cam system 45; the shaping cups 47 and 48 are driven by a second cam system 46. The cutting-shaping unit 3 is constructed and arranged with respect to the feeder 33 such that the cutting point of the shear blades 43, the movement pattern of the shaping cups 47 and 48, and the centre line of the discharge duct 53 in the outlet 31 are situated in one vertical plane I—I. The cutting-shaping unit 3 is pivotable about the shaft 29 and can be adjusted in the vertical direction with respect to the outlet 31 by means of a nut 57 which cooperates with a threshold spindle 55. The blowing unit 2 can be adjusted in a direction transverse to the plane I—I such that the path 19 described by the centre line 18 of the opening 12 of the carriers 11 is tangent to the vertical plane I—I within the tolerances admitted in practice. A glass stream discharged from the feeder 33 is cut, by means of the glass shear 4, into glass charges which are pressed and shaped into blanks by the shaping cups 47 and 48 of the blank-shaping mechanism 5, the said blanks being subsequently transferred onto the travelling carriers 11 by the blank-shaping mechanism. During the deposition of the blanks, the carriers 11 are slid-out into a pick-up position, shown at the left in FIG. 3; during the blowing and forming operation of the blanks, the carriers are in the withdrawn blowing position, shown at the right in FIG. 3, and complete the path denoted by 21 in FIG. 4, together with the blowing heads and the blowing moulds. After completion of the forming operation, the blowing heads and the blowing moulds are removed from the carriers and from the article formed; before the carriers pass the rotating blades 35 and the hammer 37 (FIG. 2), the carriers, together with the articles, are slid-out again and are tilted about a horizontal axis through an angle of 180°, into a take-off position.

Each carrier 11 and the associated control mechanism is journalled in a separate housing 61 and constitutes a unit 63 therewith (FIG. 5). A number of these identical units are arranged in continuous series on the circumference of the rotating table 9.

Figure 6:
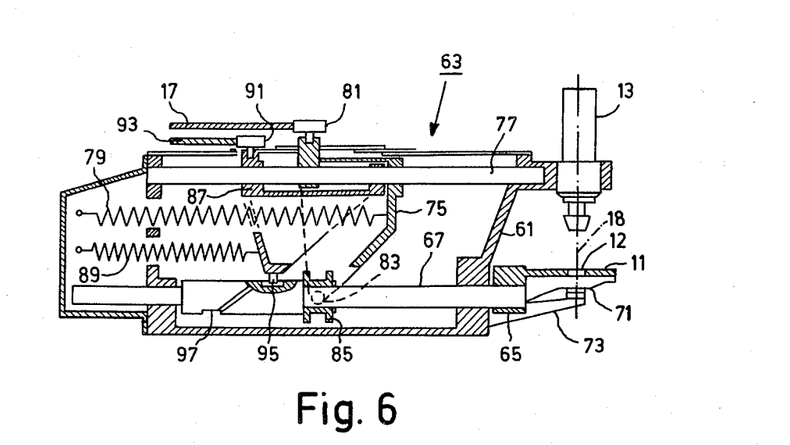
Figure 7:
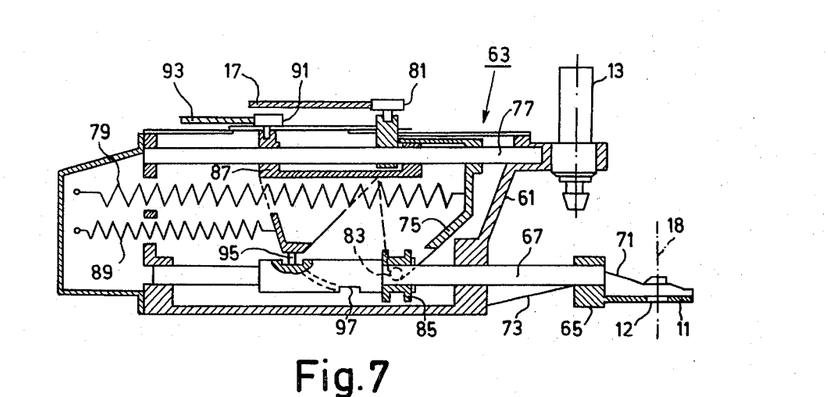

FIGS. 6 and 7 are sectional views of such a unit 63, the carrier 11 being shown in the normal withdrawn blowing position and in the slid-out, turned position, respectively. The carrier 11, provided with the opening 12, is arranged on a holder 65 which is mounted on a shaft 67. This shaft is journalled to be slidable and rotatable in the housing 61. In the withdrawn position (FIG. 6) the carrier 11 bears on two anvils 73 of the housing by way of two supports 71 provided on the carrier on both sides of the opening 12. The sliding movement of the carrier 11 is realized by an axial displacement of the shaft 67 by means of a catch block 75; the block 75 is slidable on a guide bar 77 and is pressed with a cam roller 81 against the said stationary cam disc 17 by a spring 79, the said cam disc controlling the sliding movements of the carrier 11. The block 75 is provided with a fork 83 which cooperate with a grooved ring 85 on the shaft 67. The rotary movement of the shaft 67 and of the carrier 11 is effected by means of a slide block 87 which is also slidable on the guide bar 77; the block 87 is pressed against a second cam disc 93 by a spring 89 via a cam roller 91. A pin 95 engages in a helical groove 97 in the shaft 67.

For setting the carrier from the withdrawn position to the slid-out position, the two blocks 75 and 87 and first displaced together in the axial direction, so that the carrier 11 is slid out without rotary movement. When the supports 71 have left the anvils 73, the slide block 87 lags the catch block 75. The pin 95 in the helical groove 97 will cause rotation of the shaft 67 and hence also of the carrier 11 until the carrier has been rotated through an angle of 180° (FIG. 7).

If the two blocks 75 and 85 move in the same direction and at the same speed, the carrier 11 also moves in the same direction, without being rotated. If a relative displacement takes place between the two blocks 75 and 87, the carrier 11 will perform a rotary movement.

After having passed the knife blades 35 and the hammer 37, the slide block 87 is moved further outwards under the influence of the cam disc 93, while the catch block 75 is stationary; the carrier 11 is turned back through an angle of 180° and passes along the forming unit 3 in this slid-out pick-up position (shown at the left in FIG. 3), a glass blank being deposited on the carrier in this position. Before the blowing and forming operation takes place, the two blocks 75 and 87 are slid together radially inwards so that the carrier 11 again occupies the withdrawn blowing position shown at the right in FIG. 3. The blowing head 13 which cooperates with the carrier 11 is mounted on the housing 61 and forms part of the unit 63. Once accurately mounted in the housing, the blowing head will remain accurately centered with respect to the opening 12 in carrier 11 in the withdrawn blowing position of the carrier during the forming operation of the articles.

The invention was described with reference to an embodiment of a device in which the carriers are rotated about a horizontal axis, transverse to the travelling path of the carriers; it will be obvious that the method according to the invention can be equally advantageously used in other devices as long as the articles formed are removed from the carriers in a position in which their open end is directed downwards.

What is claimed is:

1. A method of manufacturing hollow glass articles, comprising the steps of:
   depositing molten glass on a carrier having an opening therethrough, said glass covering the opening;
   moving the carrier along a closed path while performing the successive steps in the following sequence of:
   permitting a first portion of said glass to sag through said opening;
   forming said molten glass into a hollow article having one open end directed upward at the level of said opening;
   rotating said carrier about a horizontal axis to invert said article so that said open end is opened downward;
   severing a second portion of said article protruding downward from said opening; and removing said article from said carrier while said end is opened downward.

2. A method as claimed in claim 1, wherein said path is in a horizontal plane, and wherein said first portion is formed into the hollow article, the remainder of said glass forming a flange overlying a portion of said carrier about the edge of the opening, said flange being said second portion which is severed after rotating said carrier.

* * * * *